United States Patent Office 3,792,146
Patented Feb. 12, 1974

3,792,146
METHOD OF PREPARING FILMS OF POLYVINYL ALCOHOL RESINS
Saburo Kawamura, Saizo, Taiji Ozaki, Takatsuki, and Saburo Orii, Nara, Japan, assignors to Kuraray Co., Ltd., Sakazu, Kurashiki, Japan
No Drawing. Filed June 8, 1970, Ser. No. 44,568
Claims priority, application Japan, June 10, 1969, 44/45,540
Int. Cl. B29d 7/02
U.S. Cl. 264—205                                    5 Claims

ABSTRACT OF THE DISCLOSURE

Molten polyvinyl alcohol resin containing pure water of a resistivity of at least 500,000 ohm-cm. and having a viscosity of 500 to 1200 poises at 130° C., is extruded through a slit at a temperature of 95 to 105° C. onto a drying roll rotated at a speed 5 to 30 times as fast as the calculated discharge speed of the molten polyvinyl alcohol resin.

BACKGROUND OF THE INVENTION

This invention relates to a method for the preparation of films of polyvinyl alcohol resins (hereinafter referred to as PVA).

In prior methods of preparing films of polyvinyl chloride, polyethylene, polypropylene, and the like, molten anhydrides of these compounds are extruded through a slit in an extruder. However, such heat extrusion methods of molten anhydrides are very difficult to perform. In another method, a low concentration aqueous solution of such a compound is applied on a flat and smooth metal surface, a flat plated surface, a plate or rotary drum having a resin coated flat surface or an endless band, and the film thus applied is dried and then peeled off. However, this latter method requires a considerably lengthy drying time. Further, the heating surface and evaporation surface of the film are not uniform. Therefore, this latter method requires process steps and equipment for heat treatment and humidity control. Japanese patent publication No. 23037/63 of 1963 discloses yet another method of preparing films of PVA, wherein flakes, chips or pellets thereof containing a suitable quantity of water, and, as the case may be, a plasticizer and a surface activating agent, are charged in a screw type extruder, melted and then extruded from a slit in the extruder onto various film forming surfaces of the type described above. However, according to this method, the final film velocity is only five times as fast as the discharge speed of the molten PVA from the slit. Speeds higher than five times cause entrapping of air bubbles so that it is impossible to obtain transparent films of excellent finish.

SUMMARY OF THE INVENTION

It is, therefore, an object of this invention to provide an improved method of preparing thin films of polyvinyl alcohol capable of eliminating the aforesaid difficulties and disadvantages of the prior art.

Briefly, this invention is based on a unique combination of conditions regarding the preparation of the molten PVA, the viscosity thereof, the temperature at which the molten PVA is extruded through the slit, clearness of the drying roll surface, and the rotational speed of the drying roll, whereby there can be prepared PVA films which do not contain any air bubbles, do not manifest ballooning, are transparent and beautiful, have a high tear strength and orientation and have less strain, and can be prepared with a much higher degree of efficiency than the hitherto known methods of preparing PVA films.

More particularly, this invention relates to a method of preparing PVA films comprising the steps of preparing molten PVA containing pure water having a resistivity of at least 500,000 ohm.-cm. and having a viscosity of 500 to 1200 poises at 130° C., controlling the temperature of the molten PVA to a range of from 95 to 105° C., and extruding the molten PVA from a slit onto the surface of a drying roll rotating at a speed of 5 to 30 times as fast as the calculated discharge speed.

DESCRIPTION OF THE PREFERRED EMBODIMENTS

In accordance with this invention, since the molten PVA contains pure water having a resistivity of at least 500,000 ohm-cm., there are formed no salts or ions in the molten compounds which cause contamination of the surface of the drying roll when the molten compound is extruded thereon. Accordingly, the surface of the drying roll is always maintained clean, preventing entrapping of air bubbles when the extruded film comes into contact with the surface of the drying roll and even when it is driven at a high speed 5 to 30 times as fast as the calculated discharge speed of the film, thus providing transparent and beautiful PVA films.

On the other hand, when water of a resistivity of less than 500,000 ohm-cm. is employed, the continuous operation will soil the surface of the drying roll by the accumulation of salts and ions, so that operation of the drying roll at a rotational speed of 5 to 30 times as fast as the calculated discharge speed of the molten PVA results in the entrapping of air bubbles, thus rendering it impossible to obtain clear and transparent films.

The viscosity of the molten PVA is required to be 500 to 1200 poises, preferably 650 to 900 poises, at 130° C., in order to prevent production of poor films by setting them on the surface of the drying roll while they are greatly deformed by an excessive shear stress. Viscosities of lower than 500 poises and higher than 1200 poises render it difficult to prepare films by extrusion and hence to prepare transparent and beautiful films at high speeds.

Further, it is necessary to extrude the molten PVA through the slit while its temperature is controlled within the range of from 95 to 105° C. At temperatures of less than 95° C., the molten PVA becomes gelled, whereas at temperatures higher than 105° C., gases dissolved in the molten PVA are released to form bubbles.

Still further, it is necessary to extrude the molten PVA on the surface of a drying roll rotating at a speed 5 to 30 times, preferably 10 to 30 times, and more advantageously 10 to 20 times as fast as the calculated discharge speed of the molten PVA. At rotational speeds of less than 5 times, the extruded films tend to balloon at the exit of the slit whereas at speeds of more than 30 times, air bubbles are entrained between the film and the surface of the drying roll when the extruded films come to contact therewith, thus rendering it impossible to obtain beautiful films. It is preferable to adjust the surface temperature of the drying roll at a temperature ranging from room temperature to 100° C.

The PVA utilized in this invention is a partially or completely saponified PVA or saponified copolymers of vinyl acetate and a monomer copolymerizable therewith. When desired a suitable plasticizer or surface active agent may be incorporated into the molten PVA.

The following specific examples are given by way of illustration, and are not to be construed as limiting in any way the scope and spirit of the invention.

Example 1

A plasticizer was added to a PVA having a mean degree of polymerization of 1700 and a degree of saponification of 99.9 mol percent, and pure water having a resistivity of 500,000 ohm-cm. was then added to swell the PVA thoroughly. The swollen PVA was melted and its viscosity was adjusted to 760 poises at 130° C. in a liquid tank. Thereafter, the temperature of the molten PVA was decreased to 102° C. and it was then extruded through a slit of 0.6 mm. width of an extruder, under a pressure of 18 to 20 kg./cm.$^2$ onto the surface of a drying roll having a diameter of 2000 mm. and rotated at a speed 5.2 times as fast as the calculated discharge speed, the temperature of the surface being adjusted to 90° C. After running and drying on the drying roll, a transparent and beautiful film was obtained without ballooning. This film exhibited a longitudinal tensile strength of 5.20 kg./mm.$^2$, a transverse tensile strength of 5.01 kg./mm.$^2$, a longitudinal elongation of 162%, a transverse elongation of 332%, a longitudinal tear strength of 32.9 kg./mm. and a transverse tear strength of 20.8 kg./mm. This film was produced by further drying on the thirteen drying rolls after drying on the 1st drying roll rotating at a speed 5.2 times, the thickness of said film was 0.03 mm.

Example 2

A plasticizer and a surface activating agent were added to a polyvinyl alcohol having a mean degree of polymerization of 1750 and a degree of saponification of 99.9 mol percent, and the polyvinyl alcohol was thoroughly swollen with pure water of a resistivity of 1,000,000 ohm-cm. The swollen polyvinyl alcohol was melted and its viscosity was adjusted to 880 poises at 130° C. in a liquid tank. Thereafter, the temperature of the molten PVA was decreased to 102° C. and a film was extruded through a slit of a gap width of 1.0 mm. under a pressure of 15–18 kg./cm.$^2$ onto the surface of a rotary drying roll having a diameter of 2000 mm. and maintained at a temperature of 90° C. The speed of the rotary drying roll was changed variously and the results are shown in the following Table I. Each film was produced by further drying on the thirteen drying rolls after drying on the 1st drying roll rotating at said various speeds, the thickness of each film was 0.02 mm.

TABLE I

| Sample number | Factor of multiplication of the surface speed of the rotary drying roll | Conditions of the film surface |
|---|---|---|
| 1 (control) | 32 | Air bubbles were entrapped throughout the surface, and the surface was coarse. |
| 2 (this invention) | 20 | Good. |
| 3 (this invention) | 12 | Do. |
| 4 (control) | 4 | Small ripples, and surface was coarse. |

As can be clearly noted from this table, samples 1 and 4 lack transparency and beauty so that their commercial value is less, whereas samples 2 and 3 are transparent and beautiful.

Example 3

A plasticizer and a surface activating agent were added to a polyvinyl alcohol having a mean degree of polymerization of 1200 and a degree of saponification of 99.9 mol percent and the PVA was thoroughly swollen with pure water having a resistivity of 2,500,000 ohm-cm. and then formed into chips. The chips were melted and the viscosity of the molten PVA was adjusted to 920 poises and 130° C. in a liquid tank. The temperature of the molten PVA was then lowered to 100° C. and it was then extruded through a slit of 1.0 mm. gap width under a pressure of 15 to 18 kg./cm.$^2$ onto the surface of a rotary drying roll having a diameter of 2000 mm. and maintained at a temperature of 93° C. The speed of the rotary drying roll was varied variously and the results are shown in the following Table I. Each film was produced by further drying on the thirteen drying rolls after drying on the 1st drying roll rotating at said various speeds, the thickness of each film was 0.016 mm.

TABLE II

| Sample number | Factor of multiplication of the surface speed of the rotary drying roll | Conditions of the film surface |
|---|---|---|
| 1 (control) | 34 | Air bubbles were entrained through the surface, and the surface was coarse. |
| 2 (this invention) | 24 | Good. |
| 3 (this invention) | 10 | Do. |
| 4 (control) | 3 | Small ripples, and the surface was coarse. |

As Table II clearly shows, samples 1 and 4 are defective in transparency and beauty so that their commercial value is low, whereas samples 2 and 3 are transparent and beautiful.

While there have been shown and described and pointed out the fundamental novel features of the invention as applied to the preferred embodiment, those skilled in the art will appreciate that various modifications, changes, and omissions in method of preparing films of polyvinyl alcohol resins described can be made without departing from the spirit of the invention. It is the intention, therefore, to be limited only by the scope of the following claims.

The saponified copolymers of vinyl acetate and a monomer copolymerizable utilized in this invention include the saponified copolymer of ethylene and vinyl acetate, the saponified copolymer of allyl alcohol and vinyl acetate, the saponified copolymer of methylmethacrylate and vinyl acetate, and the saponified copolymer of methyl acrylate and vinyl acetate.

The PVA utilized in this invention has a degree of saponification of from 85 to 100 mol percent, and a degree of polymerization of from 1000 to 3000.

The more the resistivity of the pure water is, the more effective. Therefore the upper limit on the resistivity of the pure water can not be determined.

The thickness of the films that can be prepared according to the subject process is from 0.01 to 0.20 mm.

The dimensions of the slit through which the molten PVA is extruded are from 0.05 to 2 mm. wide and not more than 4000 mm. long.

What is claimed is:

1. A method for the preparation of films of polyvinyl alcohol comprising extruding molten polyvinyl alcohol through a slit onto the surface of a drying roll rotating at a speed of from about 10 to 30 times as great as the calculated discharge speed of the melt, said molten polyvinyl alcohol (1) containing pure water having a resistivity of at least about 50,000 ohm-cm., a plasticizer and a surface active agent, (2) having a viscosity of from about 500 to 1200 poises measured at 130° C., and (3) having a temperature of from about 95 to 105° C.

2. The method as defined by claim 1, wherein the temperature of the drying roll surface ranges from between about ambient and 100° C.

3. The method as defined by claim 1, wherein the surface of the drying roll is rotating at a speed of from about 10 to 20 times as great as the calculated discharge speed of the melt.

4. The method as defined by claim 1, wherein the molten polyvinyl alcohol has a viscosity of from about 650 to 900 poises, measured at 130° C.

5. A method according to claim 1 wherein the molten polyvinyl alcohol consists essentially of the aforementioned components.

References Cited

UNITED STATES PATENTS 3,472,804  10/1969  Nobile _____ 264—216

ROBERT F. WHITE, Primary Examiner

G. AUVILLE, Assistant Examiner

U.S. Cl. X.R.

264—210, 216